US010536397B2

(12) United States Patent
Tiwary et al.

(10) Patent No.: US 10,536,397 B2
(45) Date of Patent: Jan. 14, 2020

(54) PACKET COUNT-BASED OBJECT LOCKING PROTOCOL

(71) Applicant: SAP SE, Walldorf (DE)

(72) Inventors: Mayank Tiwary, Rourkela (IN); Sabyasachi Dhal, Bhubaneswar (IN)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 15/723,181

(22) Filed: Oct. 3, 2017

(65) Prior Publication Data

US 2019/0104084 A1 Apr. 4, 2019

(51) Int. Cl.
*G06F 13/00* (2006.01)
*H04L 12/911* (2013.01)
*H04L 29/08* (2006.01)
*H04L 12/26* (2006.01)

(52) U.S. Cl.
CPC ........ *H04L 47/828* (2013.01); *H04L 67/1008* (2013.01); *H04L 43/062* (2013.01); *H04L 67/10* (2013.01)

(58) Field of Classification Search
CPC . G06F 13/00; G06F 9/54; G06F 9/542; G06F 9/4443; H04L 12/1822; H04L 12/2602; H04L 29/06; H04L 29/0809; H04L 29/0813; H04L 29/08072; H04L 29/08144; H04L 41/22; H04L 43/00; H04L 47/10; H04L 63/08; H04L 63/10; H04L 67/42; H04L 67/2852; H04L 12/911; H04L 29/08; H04L 43/062; H04L 47/828; H04L 67/10; H04L 67/1008

USPC .................................. 709/201, 224; 719/310
See application file for complete search history.

(56) References Cited

U.S. PATENT DOCUMENTS

| | | | |
|---|---|---|---|
| 6,336,147 B1 * | 1/2002 | Brownell | G06F 9/465 719/310 |
| 8,190,740 B2 | 5/2012 | Stienhans et al. | |
| 8,689,179 B2 | 4/2014 | Remmel et al. | |
| 9,264,301 B1 | 2/2016 | Chua et al. | |
| 9,459,931 B2 | 10/2016 | Archer et al. | |
| 9,553,951 B1 * | 1/2017 | Nguyen | H04L 67/42 |
| 9,596,169 B2 | 3/2017 | Choudhury et al. | |
| 2014/0365549 A1 | 12/2014 | Jenkins | |
| 2016/0050125 A1 | 2/2016 | Mattson et al. | |

* cited by examiner

*Primary Examiner* — Robert B Harrell
(74) *Attorney, Agent, or Firm* — Buckley, Maschoff & Talwalkar LLC (57) ABSTRACT

Methods and system are disclosed that manage access to a logical object in software defined networks. In one aspect, managing access to the logical objects may include determining whether to retain or release a lock object on a corresponding logical object in the software defined network. The software defined network may receive multiple requests to access applications or logical objects. In response, a front-end engine may be instantiated. The front-end engine may communicate with a back-end engine to determine an availability of TCP communication ports, lock objects, etc., to access the requested logical objects. A network monitoring engine working in cooperation with the front-end engine and the back-end engine may receive the above information on the TCP communication ports, the lock objects, etc., and may determine whether to retain a lock object on a corresponding logical object or to release the lock object and the corresponding logical object.

17 Claims, 7 Drawing Sheets

PACKET COUNT-BASED OBJECT LOCKING PROTOCOL

BACKGROUND

Typically, real world processes and applications execute on integrated heterogeneous systems. For example, processes implemented on systems, applications, etc., may provide on-demand functionalities via online platforms (e.g., over a network using the Internet, such as World Wide Web). Such provisioning of the on-demand functionalities via systems may employ mechanisms for monitoring access to resources, applications, data, etc. However, such mechanisms may be complex, inefficient, may have multiple points of communication, inflexible, etc., thereby adding to redundancy to the infrastructure and increasing costs. Further, such monitoring access mechanisms may not be able to cope with real-time requirements. Therefore, providing a mechanism that dynamically monitors the access to resources, such that a software defined system is reconfigurable in real-time, by overcoming the aforementioned drawbacks, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques related to managing access to logical objects in software defined networks are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a feature, structure, or characteristic described in connection with the embodiment is included in at least one of the one or more embodiments. Thus, the appearances of these phrases in various places throughout this specification are not necessarily all referring to the same embodiment. Furthermore, the features, structures, or characteristics may be combined in any suitable manner in one or more embodiments.

Computing devices in a cloud computing environment may work independently or cooperatively to provide execution of functionalities or operations. Coordinating between the multiple systems and managing access to resources, for example, applications, systems, data structures, data, etc., in the cloud computing environment may play a vital role in cooperative functioning of the applications and systems in a cloud computing environment. Users logging into the systems, applications, etc., on the cloud computing environment may initiate requests or dynamically trigger queries for executing operations and functionalities in real-time.

In an embodiment, the initiation of such requests or dynamic triggering of queries in real-time may increase network traffic. Further the network traffic may vary (e.g., increase or decrease) based on, for example, number and type of user queries, user behavior of logging onto cloud computing environment, logging off the cloud computing environment, etc. Such network traffic may be cooperatively monitored by network controllers (local area network (LAN) controller, wide area network (WAN) controller, etc.) and other systems, applications, or software components deployed in the cloud computing system. In an embodiment, the above network controllers, components, etc., may cooperatively work to monitor the user behavior, the queries generated from the users, etc., and may share the monitored information between different systems and components in the software defined network. In an embodiment, based on such monitoring information, the access to the resources in the cloud computing environment may be managed.

In an embodiment, the terms software components, components, software routines, routines, software models, models, software engines, engines, software scripts, scripts, layers etc., are employed interchangeably throughout the subject specification, unless context warrants particular distinction(s) among the terms depending on implementation. The implementation primarily involves executing computer readable code such as, a sequence of instructions, by a processor of a computing device (e.g., a special purpose computer, a general-purpose computer, mobile device, etc.) in an integrated environment. The computing device may execute as the special purpose computer when the memory in the computing device stores instructions that are executed by the processor, provide specific operations or functionalities (contextually the cooperative and/or independent functioning of front-end engine, front-end query classifier, back-end query classifier, network monitoring engine, back-end engine, controllers, managing access to logical objects, etc., may facilitate the functioning of the computing device as the special purpose computer). For example, the memory may store instructions not limited to monitoring users logging on and logging off, network traffic generated by the users, classifying queries triggered by the users, processing requests initiated by the users, generating communication ports and a corresponding lock objects, monitoring user behavior, determining whether to release or retain lock objects on the corresponding logical objects, etc. In an embodiment, a lock object may correspond to mechanism that may be used to synchronize access to the same data by more than one program. The cooperative execution of the above operations or functionalities may therefore improve the functionality of the special purpose computer. The execution of specific operations or functionalities, either individually or cooperatively, may effectively manage accessing resources and/or logical objects, thereby rendering the computing device perform operations as the special purpose computer. The above models, software components, software routines, etc., may be reused based on definition and implementation.

Figure 1:
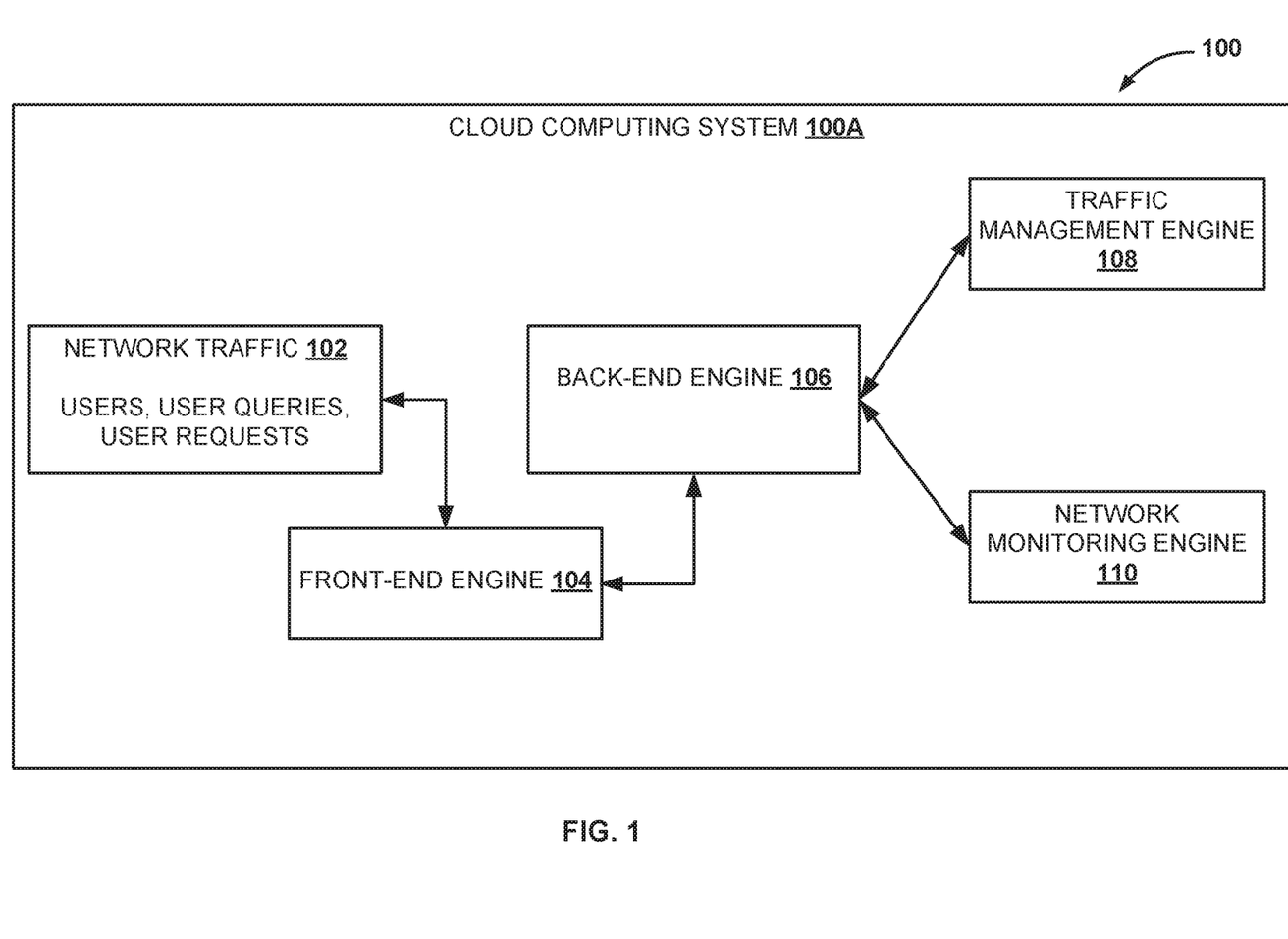
FIG. 1 is a block diagram illustrating an environment to manage access to logical objects, according to an embodiment.

FIG. 1 is a block diagram illustrating environment 100 to manage access to logical objects, according to an embodiment. FIG. 1 shows an environment 100 including a software defined network (SDN) in cloud computing system 100A. The cloud computing system 100A may include multiple tenants (not shown), multiple controllers (not shown), for example, SDN LAN controller (not shown), SDN WAN controller (not shown), data center network controller (not shown), front-end engine 104, back-end engine 106, traffic management engine 108, networking monitoring engine 110, etc. Network traffic 102 may correspond to information or data associated with the users logged onto the tenants, and the triggered requests (e.g., user queries, user requests, etc.) for execution of operations or functionalities on the cloud computing system. The network traffic may also include requests initiated by users to access logical objects, applications, systems, etc., on cloud computing system 100A. In an embodiment, the logical objects may correspond to logical data objects that may encapsulate data. The logical object may be accessed over a network and operations or functionalities may be executed on the logical object. In an embodiment, the network traffic 102 may be cooperatively monitored by the above controllers and engines monitored by network controllers (e.g., SDN LAN controller, SDN WAN controller, etc.). In an embodiment, the SDN LAN controller, the SDN WAN controller, data center network controller, etc., may be collectively or individually, also referred to as network controllers. For example, the SDN LAN controller may be deployed and operate on a user or customer site (e.g., tenants), the SDN WAN controller may be deployed and operate on Internet layer, via which the users establish connections with cloud computing system 100A. In an embodiment, network controllers, the query classifiers, the front-end engine 104, back-end engine 106, traffic management engine 108, network monitoring engine 110, etc., may cooperatively work in cloud computing system 100A to manage access to the applications, systems, logical objects, etc.

Figure 2:
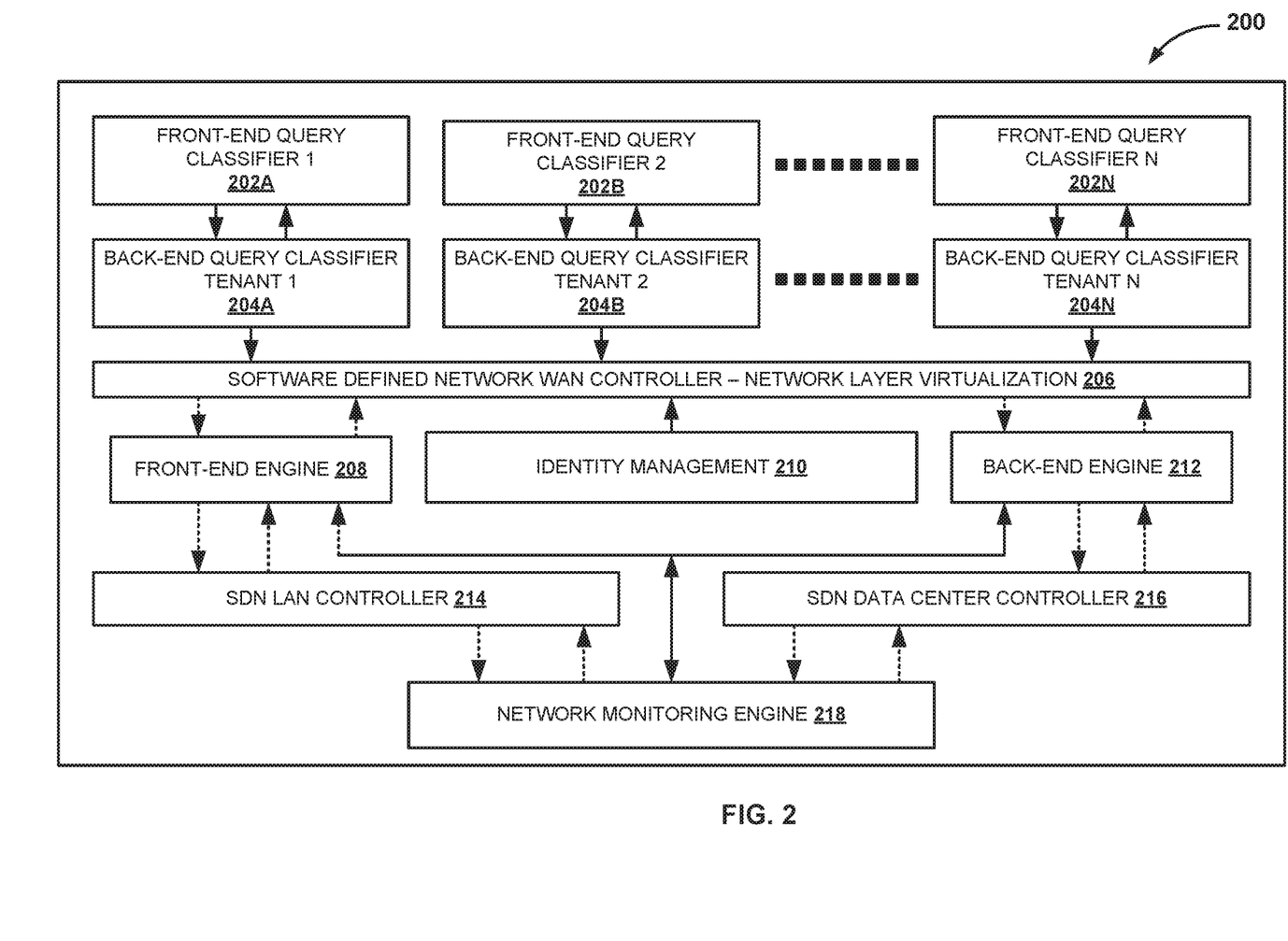
FIG. 2 is a block diagram illustrating a computer system landscape of a software defined network to determine whether to release or retain a lock object on a corresponding logical object, according to an embodiment.

FIG. 2 is a block diagram illustrating computer system landscape 200 of a software defined network to determine whether to release or retain a lock object on a corresponding logical object, according to an embodiment. FIG. 2 shows a computer system landscape including multiple software components (e.g., 202A . . . 202N, 204A . . . 204N, 206, 208, 210, 212, 214, 216 and 218) that may be implemented to provide a framework for a software defined network. The software components (e.g., 202A . . . 202N, 204A . . . 204N, 206, 208, 210, 212, 214, 216 and 218) in the computer system landscape may work independently or in cooperation with each other, to execute specific operations or functionalities. In an embodiment, a tenant (not shown) may represent an application or system in a distributed computing environment (e.g., cloud computing environment). Multiple tenants may be deployed in the cloud computing environment and end user(s) may log on to the tenants and execute specific functionalities or operations. The computer system landscape 200 defines the software defined network, which may include front-end query classifiers (202A. 202B, . . . 202N), back-end query classifiers (204A, 204B, . . . 204N), software defined network monitoring component (also referred to as SDN WAN Controller 206), front-end engine 208, identity management 210, back-end engine 212, SDN LAN controller 214, SDN data center controller 216, network monitoring engine 218, etc.

The components (e.g., 202A, 202B . . . 202N; 204A, 204B, . . . 204N; 206, 208, 210, 212, etc.) may execute independently to provide specific functionalities or work cooperatively to provide functionalities, such as, monitoring user activities, classifying queries triggered by the users based on predetermined parameters and conditions, determining whether to retain a lock object or to release on the lock object on the corresponding logical objects, etc. In an embodiment, the tenants in the cloud computing environment may cooperatively work with front-end engine, front-end query classifier (e.g., 202A), back-end query classifier (e.g., 204A), back-end engine, etc. For simplicity of understanding, the functional efficacy of one embodiment of front-end query classifier (e.g., 202A) and back-end query classifier (e.g., 204A) is described. It may be apparent that the functional efficacy of one embodiment may be replicated, when referencing one or more of multiple front-end query classifiers (e.g., 202A, 202B, . . . 202N) and back-end query classifiers (e.g., 204A, 204B, . . . 204N) as shown in FIG. 2. In an embodiment, the periodic execution of front-end query classifier (e.g., 202A) may monitor enterprise resource planning (ERP) queries (also referred to as queries or requests for executing specific operations, requests for initiating accessing logical objects, etc.) generated or triggered by the users of the tenants, while the execution of back-end query classifier (e.g., 204A) on the tenants may classify the queries triggered from the users. In an embodiment, front-end query classifier (e.g., 202A) may be executed as a software script (e.g., sequence of instructions executed by a processor) cooperatively working with the web browsers on the tenants.

In an embodiment, the users may use a web application that may work in cooperation with front-end query classifier (e.g., 202A) and a front-end engine. When the users make requests by initiating access to logical objects or by triggering queries, front-end engine 208 may forward or send such requests via front-end query classifier (e.g., 202A) to a particular port of the web application machine. The particular port of the web application machine may be identified by a transmission control protocol (TCP) address. In an embodiment, specific ports may be configured to indicate specific type of queries. For example, front-end query classifier (e.g., 202A) may send the queries to a first port of the web application machine; a second type of query message to a second port of the web application machine, and so on.

In an embodiment, back-end query classifier (e.g., 204A) may classify the queries triggered by the end users based on computational efficacies of the queries. The computational efficacies may correspond to results or output generated by the execution of the queries. The computational efficacies may be computed by back-end query classifier (e.g., 204A) based on the CPU utilization level when processing queries or requests such as the above supplier invoice. The back-end query classifier (e.g., 204A) may categorize the queries or classify the queries into multiple levels. For example, such categories or classification may be represented by Level 1 (L1), Level 2, (L2), Level 3 (L3), etc. For example, L1 classified query may represent highest level of computational efficacy (e.g., highest level of computational intensiveness or highest level of CPU utilization of about more than 90%), L2 classified query may represent lower than the highest level of computational efficacy (e.g., lower than the highest level of computational intensiveness or lower than the highest level of CPU utilization of about more than 80% but less than 90%) and so on, in descending order of computational efficacy. In an embodiment, the queries may be classified based on transmission control protocol (TCP) port addresses via which the queries may be triggered and processed. For example, the components SDN WAN controller may provide virtualization of internet layer (e.g., SDN application represented by SDNA1 may be deployed on local area network 1 LAN1 and SDNA1 may cooperatively work on local area network 2 (LAN2) with abstraction. Such abstraction may provide virtualization of internet layer using WAN devices such as routers), and SDN LAN controller may provide virtualization of data link layer (e.g., SDN application represented by SDNA1 may be deployed on cloud computing network 1 CCN1 and SDNA1 may cooperatively work on cloud computing network 2 (CCN2) with abstraction, thereby providing virtualization of internet layer using LAN devices such as network switches) and both controllers may be configured to identify TCP port addresses associated with the queries. In an embodiment, based on the computational efficacies of the queries, back-end query classifier (e.g., 204A) may assign weights to the queries.

In an embodiment, front-end engine 208 may be instantiated, when it receives requests from the users. For example, the requests may include an initiation to access the applications or logical objects at a back end. In response to the initiated requests, back-end engine 212 may provide information on an availability of the communication ports via which the logical objects or applications may be accessed at the back end (back end may include systems, databases, etc., storing data as logical objects in data structures). In another embodiment, back-end engine 212 may be configured to generate the communication ports and/or lock objects to lock the access the logical objects or the applications and provide this information to front-end engine 208. As described previously, each communication port may be identified a corresponding transmission control protocol (TCP) address. In an embodiment, the information communicated by back-end engine 212 to front-end engine 208 may also include an availability of the lock objects, that may be used to lock the corresponding logical objects. For example, when back-end engine 212 communicates information about the communication ports, it may include generating lock objects, associated TCP addresses for the TCP communication ports, etc. When the logical objects are accessed via specific TCP communication ports, they may be locked by the lock objects, thereby encapsulating the communication link. The encapsulated communication link may be established between the user initiating the request to access the logical objects, the TCP communication port and the associated lock object. In an embodiment, back-end engine 212 may be configured to communicate with the multiple systems, applications, the logical objects, etc., that may be stored in data structures at the back end. Based on the information of the TCP communication ports and the corresponding lock objects, front-end engine 208 may encapsulate the access to the logical objects via the corresponding lock objects, by utilizing the encapsulation mechanism provided by back-end engine 212.

In an embodiment, upon establishing the encapsulated communication link, front-end engine 208 may notify about the encapsulation to network monitoring engine 218. Such information may include related to the addresses of the TCP communication ports, the lock objects and the corresponding logical objects. The network monitoring engine 218 may monitor the logical objects via the TCP communication ports and the corresponding lock objects. The network monitoring engine 218 may be configured to monitor the user activities such as, users logging into the system, logging off the system, accessing multiple applications and logical objects at the back end, activities performed by the users on the logical objects, etc. Further, network monitoring engine 218 may determine whether to retain the corresponding lock objects on the logical objects or to release (also referred to as unlocking logical objects) the corresponding lock on the logical objects, based on the monitored user activities. In an embodiment, the controllers (e.g., 206, 214 and 216) may retrieve information related to user devices, for example, the media access control (MAC) addresses of user devices, by communicating with the component, for example, an identity management 210 (e.g., retrieve user registered devices from identity management 210). In another embodiment, an identity management server may store information related the users and registered devices used by the users.

Figure 3:
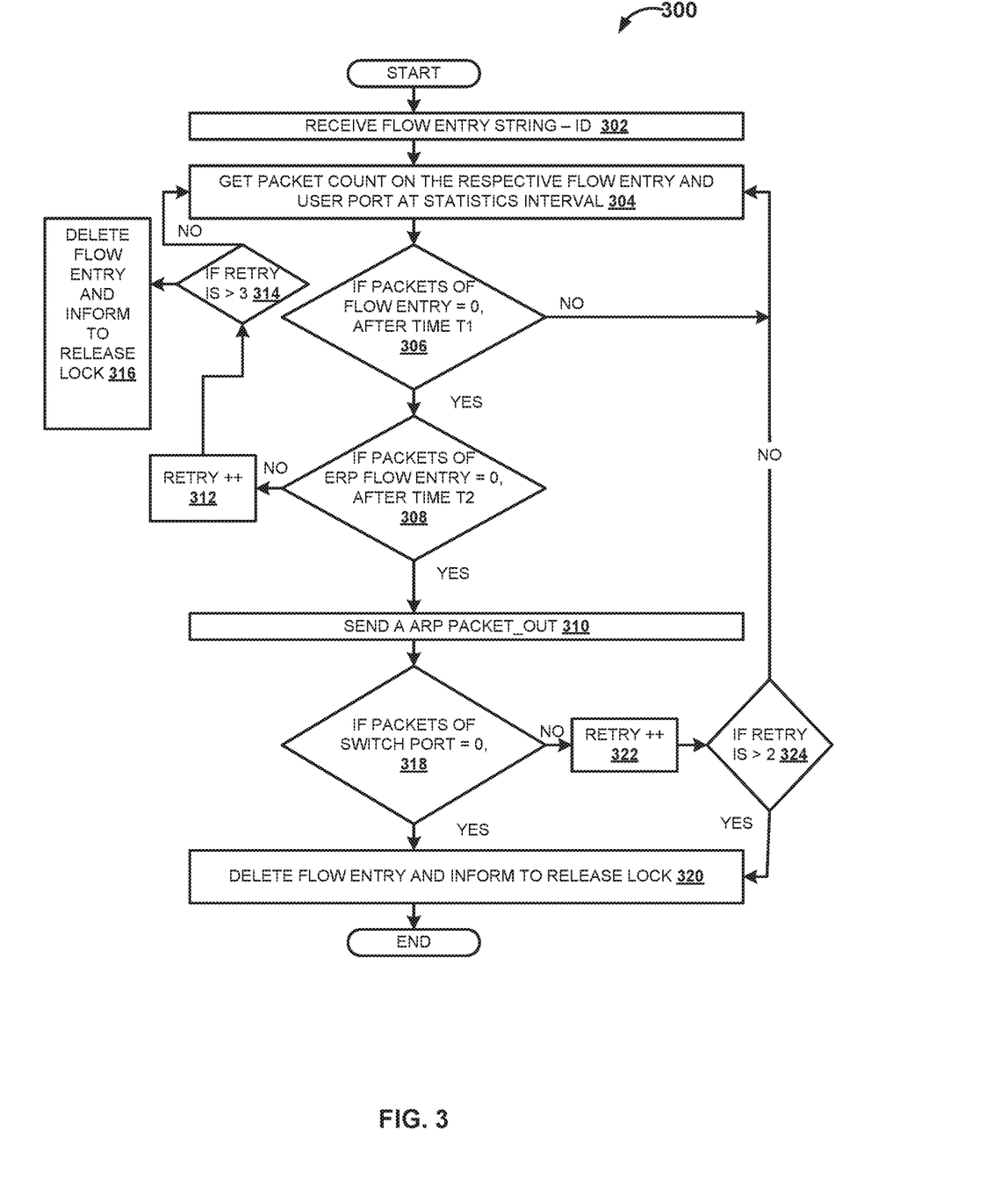
FIG. 3 is a flow diagram illustrating a process to monitor user activities by a network monitoring engine, according to an embodiment.

FIG. 3 is a flow diagram illustrating process 300 to monitor user activities by a network monitoring engine, according to an embodiment. As described previously, information on the availability of the TCP communication ports including the lock objects may be generated and this information may be communicated by the back-end engine, in response to the received requests processed by the front-end engine. The back-end engine may communicate the above information to the front-end engine and may instantiate the monitoring of network activities by the network monitoring engine. In an embodiment, the network monitoring engine may be deployed in LAN controller or the WAN controller and the determination of such a deployment may depend on technical implementation and/or business requirements. The network monitoring engine may be configured to monitor the user activities including the network traffic, the requests initiated by the users for executing operations or functionalities on applications, initiating requests for accessing the logical objects at the back end, monitoring data packets and user activities when specific logical objects are accessed and locked for executing operations or performing activities, etc. In an embodiment, upon receiving the information on the TCP communication ports and the corresponding lock objects, the network monitoring engine may instantiate a traffic management engine (not shown in FIG. 2). The traffic management engine may receive information, such as TCP communication port addresses including the corresponding lock objects via which the logical objects may be accessed, user identifiers of the users initiating the request to access the logical objects, etc. The network management engine in cooperation with traffic management engine and identity management component may reference or extract information a table that may include information related to media access control (MAC) addresses of the devices used by the users. The table may store information of a correspondence between the multiple devices and multiple users based on each device MAC address and the user identifier for each user. When the user initiates the request to access logical objects or execute operations or functionalities at the back end, the front-end engine may communicate with the back-end engine that may determine the availability of TCP communication ports, the lock objects etc. As described previously, the access to the requested logical objects may be provided based on the determination of the availability of the TCP communication ports, the lock objects, etc. Based on such determination, the information including the availability of the TCP communication ports, the corresponding lock objects and the user identifiers may be communicated to the network monitoring engine and the traffic management engine. Based on the above received information (also referred to as traffic flow entries or flow entries) and a preconfigured combination of multiple rules, the traffic management engine may be configured to deploy or install the above information onto other devices (e.g., OpenFlow (OF) devices) in the network. In an embodiment, upon deploying or installing the information including the flow entries on OF devices, the back-end engine may lock the access to logical objects or the applications via the TCP communication ports and the corresponding lock objects. As described previously, the front-end engine may encapsulate the access to the logical objects via the corresponding lock objects and the TCP communication ports. Any subsequent requests for execution of operations or functionalities on the locked logical objects may be processed and managed via the encapsulated link. In an embodiment, such an encapsulated link may facilitate maintaining a Quality of Service (QoS) including smooth, uninterrupted traffic flow without a disruption in the QoS. In an embodiment, the traffic management engine in cooperation with the network monitoring engine may monitor the network traffic including the aforementioned user activities. In an embodiment, the network monitoring engine may monitor network traffic statistics including a count of data packets through specific TCP communication ports, which may be periodically updated or stored in a data structure (e.g., a table) associated with the network monitoring engine.

In an embodiment, the information including the TCP communication ports, the corresponding lock objects, etc., communicated by the back-end engine may additionally include threshold values associated with time (also referred to as time threshold values). For example, the above information may include multiple values of thresholds values, for example, 'T1', 'T2', etc. Such time threshold values may correspond to an estimate of time taken by a user to execute an operation or functionality on the applications or on the logical objects. For example, threshold value 'T1' may represent a median value, and 'T2' may represent a highest value, of an estimate of time taken by the user to fill or input information into the data fields associated with a logical object, for example, a user form. Based on multiple parameters associated with the user form, for example, the number of data fields in the form, historic information of the time taken by a specific user to input or fill information in the user form, average time taken by multiple users to fill information in the user form, etc., the estimated time threshold valued 'T1' and 'T2' may vary from one user to another. In an embodiment, when the user initiates a request for accessing the user form, the back-end engine may communicate the information of the TCP communication port, the corresponding lock object and the estimated time threshold values 'T1' and 'T2' to the front-end engine. This information may further be communicated to the network monitoring engine and the traffic management engine. As described previously, the encapsulated communication link may be established by the front-end engine and the network monitoring engine may be instantiated to start network monitoring of the user activities. In an embodiment, the monitoring activities may include monitoring the data packets (e.g., by maintaining a count of the data packets) via the corresponding TCP communication port and the corresponding lock object, determining information related to user session, which may include tracking or monitoring if the user session is active or inactive, tracking or monitoring the activities on the accessed logical object (e.g., if the user is active or inactive or actively working on the accessed logical object), etc. For instance, in response to the monitoring, when the network monitoring engine determines that the count of the data packets flowing through the corresponding TCP communication port is zero ('0'), such monitoring information may correspond to the user session being inactive or the user not executing any operation on the corresponding logical object (e.g., the user form).

In an embodiment, the network monitoring engine may monitor data packets traversed against other flow entries associated with the user identity. For example, such other flow entries may be created, when the user logs onto the network first time and may also be referred to as general flow entries associated with the user (e.g., receive flow entry string-id 302). Upon receiving the flow entries, information related to packet count of the respective flow entries and TCP communication ports may be determined (e.g., 304). For instance, suppose that a user A logs onto the cloud computing environment for a first time and initiates an access to Y and Z. As described previously, a corresponding TCP communication port and the lock objects may be provided by the back-end engine to access the logical objects Y and Z. As described previously, flow entries (e.g., flow entry 'P' corresponding to a general flow entry; 'Q' flow entry corresponding to logical object Y and 'R' flow entry corresponding to logical object 'Z') corresponding to the user identities may be created in the table, that may be accessed by the network monitoring engine and other components/devices in the cloud computing environment. Now suppose that user A is only actively accessing logical object Z, which may result an inactivity on the logical object Y. In an embodiment, a non-zero value of the count of the data packets (e.g., with reference to logical object Y) may indicate that the user may be active or accessing other applications and/or logical objects (e.g., logical object Z) at the back end. In an embodiment, the count of data packets may be monitored and the count corresponding to time threshold values 'T1' (e.g., 306) and 'T2' (e.g., 308) may be determined. If the response of determination in 306 is 'NO', step 306 loops back to 304, as shown in FIG. 3. If the response of the determination in 306 is 'YES', step 306 continues to evaluate count of data packets with reference to time threshold value 'T2', as shown in 308 of FIG. 3. The above explained determinations (e.g., 318) may be executed at one or more network switches deployed in the cloud computing environment. In an embodiment, the network monitoring engine may instantiate an access retry mechanism (implemented as an access retry engine; e.g., 312 and 322) to monitor the other flow entries for the user (e.g., corresponding to logical objects X and Y). For example, the network monitoring engine in cooperation with the access retry engine may attempt or retry determining a predetermined number of times (e.g., 2, 3 or 4 times; e.g., 314 and 324), to whether retain the lock object on the corresponding logical object (e.g., logical object Y) or release the lock object and the corresponding logical object. Based on such determination, the network monitoring engine may communicate and work in cooperation with the back-end engine to release or remove the corresponding lock object from the logical object and reset the time threshold values (e.g., 'T1', 'T2') associated with the logical objects (e.g., delete flow entry and inform to release lock 316).

In an embodiment, when the network monitoring engine determines that the count of the data packets is zero traversed against other flow entries corresponding to the user identity, the network monitoring engine may determine that the user is not active and it sends a ARP 'packet_out' (e.g., 310) data packet to the respective devices or components (e.g., OF switch). The OF switch may send or forward this 'packet_out' data packet the corresponding physical switch ports. If the user and/or the user device, through which the user had initiated the request to access the logical object or applications is alive (or active), the network monitoring engine may receive a reply (e.g., a response data packet). In an embodiment, upon receiving the response from the user or user device, the networking monitoring engine may continue monitoring the other data packets. In an embodiment, if the network monitoring engine does not receive any response (e.g., in response to ARP 'packet_out'), the network monitoring engine may remove/release the lock objects and the corresponding logical objects. The network monitoring engine may further communicate this information including the released lock objects and the corresponding logical objects to the back-end engine and other software component in the software define network. In an embodiment, upon receiving the above information corresponding the released lock objects and the corresponding logical objects, a data center controller working in cooperation with the other engines, modules, etc., in the SDN may also remove the corresponding flow entries (e.g., delete flow entry and inform to release lock 320), thereby releasing the memory (e.g., TCAM memory) on data center switches. Subsequently, the back-end engine may release the TCP communication ports, the corresponding lock objects and the logical objects that were assigned with the corresponding user identity.

Figure 4:
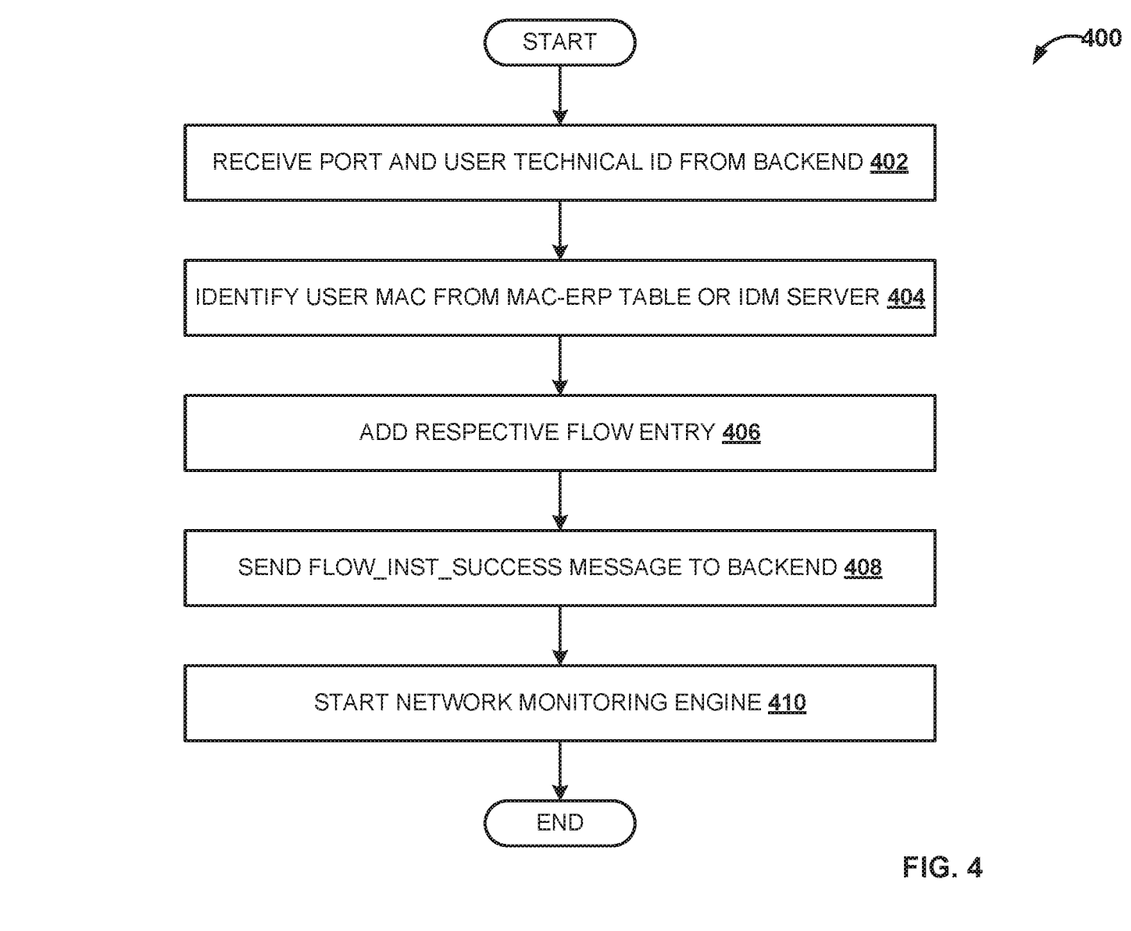
FIG. 4 is a flow diagram illustrating a process of including a sequence of steps executed by a traffic management engine, according to an embodiment.

FIG. 4 is a flow diagram illustrating a process of including a sequence of steps executed by a traffic management engine, according to an embodiment. In an embodiment, the front-end engine may be implemented using, for example, JavaScript (JS), on the computing devices of the users. The front-end engine may receive requests for accessing applications or logical objects at the back end. As described previously, the front-end engine may be configured to communicate such requests to the back-end engine and the back-end engine may respond with the information including the availability of TCP communication ports, the corresponding lock objects and time threshold values 'T1' and 'T2' associated with the logical objects. In an embodiment, the back-end engine may be configured to determine whether the requested logical object is already locked for access by another user or is available for accessing by the user requesting the access. Based on such determination, the back-end engine may communicate information on the availability of TCP communication ports to a traffic management engine working in cooperation with the network monitoring engine. As described previously, when the TCP communication ports, the lock objects, etc., are available, the traffic management engine may be configured to install a flow entries including information on the TCP communication ports, the lock objects, time threshold values, etc., for locking the access to the requested logical object. In an embodiment, the traffic management engine may work in cooperation with the network monitoring engine. FIG. 4 shows process 400 indicating a sequence of steps executed by the traffic management engine. As described previously, the traffic management engine may install the flow entries, upon receiving the information on the TCP communication ports, user identities, etc. (e.g., 402). As described previously, the traffic management engine working in cooperation identity management component may reference or extract information a table that may include information related to media access control (MAC) addresses of the devices used by the users. The table may store information of a correspondence between the multiple devices and multiple users based on each device MAC address and the user identifier for each user (e.g., 404). In an embodiment, the flow entry including the correspondence between the user identities and the multiple devices may be stored in the table (e.g., 406). Upon installing the flow entry details, the traffic management engine may communicate this information to the back end (e.g., send flow_inst_success message to backend 408). In an embodiment, the traffic management engine may further trigger the network monitoring engine to start monitoring the user activities (e.g., 410).

In an embodiment, based on the time threshold value 'T1', the front-end engine may instantiate the network monitoring engine to monitor traffic (e.g., user activities, data packets, etc.) for the corresponding the locked logical object via the TCP communication port. Upon an elapse of time 'T1', the front-end engine may trigger a random burst of traffic (e.g., data packets) via the TCP communication port that may increase the count of data packets and the front-end engine may wait for a response from the user. A receipt of a response from the user by the front-end engine, may provide an indication to the network monitoring engine, that it may continue to retain the corresponding lock objects on the requested logical objects via the back-end engine. However, if the front-end engine does not receive a response from the user, which may be, for example, based on abrupt termination of the access to the logical object (e.g., termination of session initiated by the user, closing or restart of the browser, etc.), the network monitoring engine may determine the state (e.g., active, inactive, etc.) of the lock objects and the corresponding logical objects and communicate this information to the front-end engine. In an embodiment, the network monitoring engine may monitor changes in the traffic and such monitoring may propel the network monitoring engine to reset the time threshold values, which may be communicated to the back-end engine. This information including the resetting of the time threshold values may be communicated to the front-end engine, thereby synchronizing the time threshold values. Upon receiving such information, the network monitoring engine may restart monitoring by resetting the threshold values 'T1' and 'T2'.

Figure 5:
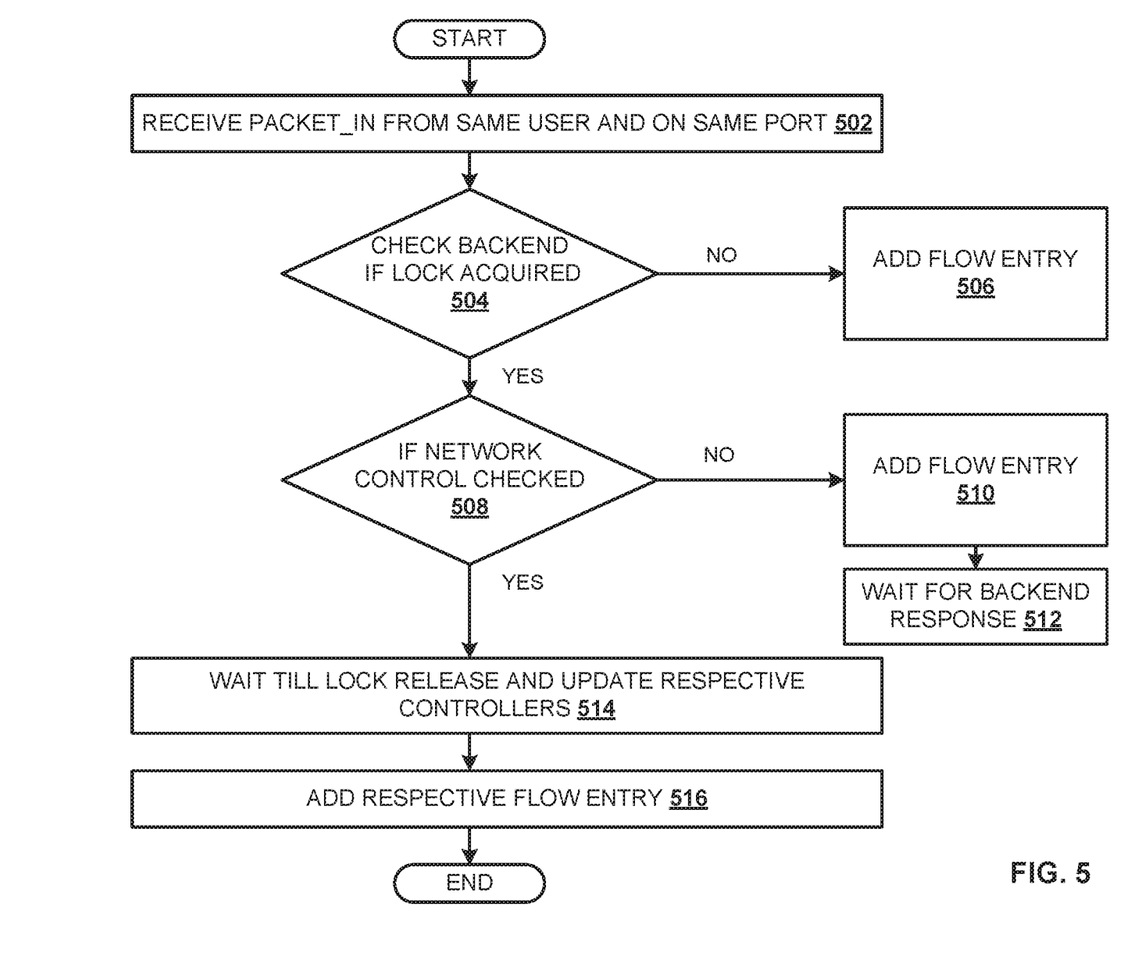
FIG. 5 is a flow diagram illustrating a process for retrying an access to a logical object after a lock of the logical object is released, according to an embodiment.

FIG. 5 is a flow diagram illustrating a process for retrying an access to a logical object after a lock of the logical object is released, according to an embodiment. In an embodiment, when a lock object associated with a logical object is released, a user may not be able to access the logical object. For instance, when the user session is active, the front-end engine may trigger or fire data packets via the corresponding TCP communication port associated with the logical object, and subsequently the network monitoring engine may receive data packet, for example, packet_in (e.g., initially, when there are no flow entries related to the logical objects, the network monitoring engine may receive the data packet, packet_in 502). In an embodiment, an access retrying mechanism (e.g., implemented as access retry module or access retry engine) in communication with the back-end engine may validate the availability of the logical object requested by the user (e.g., 504). For example, such a validation may include verifying whether the logical object is locked, for example, in use or accessed by another user. In an embodiment, when the access retry engine determines that the logical object is not locked by another user, it may add or store (e.g., 506) the corresponding flow entries associated with the logical object in the table and communicate this information to the back-end engine. In an embodiment, when the access retry engine determines that the requested logical object is locked by another user, the network monitoring engine may validate it (e.g., 508), add the corresponding flow entries (e.g., 510) and wait (e.g., 512 and 514) until the lock object and the corresponding logical objects are released. Upon determination of the released lock object and the corresponding logical object, the access retry engine may add or store the corresponding flow entries (e.g., 516) associated with the logical object in the table. In an embodiment, the network monitoring engine may continue to monitor the status of the logical objects and determine and/or provide information whether the logical object is accessible or not. When the network monitoring engine determines that the lock object and the corresponding logical objects are released, it may add and/or update the corresponding flow entries in the table. In an embodiment, the network monitoring engine may wait for a response from the back-end engine, which may include information related to the release of the lock object and the corresponding logical object. In an embodiment, when the logical object is locked by user A and when user B may try to access the locked logical object, the user B may receive a notification indicating an error and an information that the requested logical object is locked for access by user A.

For example, consider a user X with media access control address (MAC address) aabbcc logs onto a system (e.g., Enterprise Resource Planning (ERP) system) deployed in a cloud computing environment. Consider that the cloud computing environment has a gateway with a public internet protocol (IP) address 8.8.8.8. As discussed previously, when the user logs onto the ERP system in the cloud computing environment, the network monitoring engine may install an ERP flow entry into a table as follows: #1 origin source address—aabbcc; source port address—443 (e.g., default address); destination address—8.8.8.8; action—forward via port address. Upon installation of such flow entry in the table, the user may be allowed to access the ERP system. In an embodiment, upon logging onto the ERP system, the user may initiate a request to access a logical object stored in a database on the cloud computing environment. As described previously, upon such request initiation, the front-end engine may communicate with the back-end engine to check the availability of TCP port address and time threshold values (e.g., 'T1' and 'T2') for accessing the requested logical object. In response, the back-end engine may communicate the requested information as: TCP port address=880; T1=1 minute and T2=3 minutes. This information may be communicated to the network monitoring engine and the front-end engine. Upon receiving the above information, the network monitoring engine may install or store the flow entries in the table and communicates about the installation or storage to the back-end engine. #2 origin source address—aabbcc; source port address—880 (e.g., for accessing the requested logical object); destination address—8.8.8.8, action—forward via port address. As described previously, the back-end engine may provision the lock object for locking the requested logical object and subsequently the user may access the requested logical object. In an embodiment, the network monitoring engine, upon an elapse of time 'T1', may monitor the number of packets traversed through the flow entry #2. If the count of number of packets traversed corresponding to the flow entry #2 is zero, the network monitoring engine may monitor for data packets corresponding to the flow entry #1 (e.g., also referred to as general ERP flow entry), after an elapse of time 'T2'.

As described previously, if the user session is active, the count of number of data packets corresponding to the flow entry #1 may be a non-zero. In response to the above determination, the network monitoring engine in cooperation with the access retry engine may monitor the count of data packets corresponding to flow entry #2 for a predetermined number of times. For example, the network monitoring engine in cooperation with the access retry engine retries determining, for example, 3 times, the count of number of data packets corresponding to flow entry #2. In an embodiment, upon retrying 3 times, when the network monitoring engine determines that the count of number of data packets corresponding to the flow entry #2 is zero, the network monitoring engine may communicate this information to the back-end engine and may indicate the back-end engine to release the lock object and the corresponding logical object.

In an embodiment, if the count of data packets corresponding to the flow entry #2 is non-zero, then the network monitoring engine may send data packets, for example, ARP pack_out, across all physical ports of the respective switch or router. Upon receiving the ARP packet_out data packet, every active user responds and there is corresponding increase in the count of data packets against flow entries (e.g., flow entries corresponding to each user, which include a general flow-entry and the flow entry corresponding to the access to the logical objects). In an embodiment, when the flow of traffic of the user for the locked object is not transmitted on the same TCP port over WAN, the gateway device translates back to the same normal https port. The communication over TCP port takes place only in LAN. In an embodiment, the common TCP communication ports may be translated to provide transport or transmission of network traffic via WAN The controller collects the traffic statistics using flow_stats_requests feature of OpenFlow. The network monitoring engine may transmit flow_stats_requests message to respective network devices and in response may receive information on the traffic statistics. In an embodiment, the network devices, for examples, switches or routers may respond to the request by sending flow_stats_reply message or data packets to the network monitoring engine. The flow_stats_reply message or data packets may include information of network traffic statistics.

Figure 6:
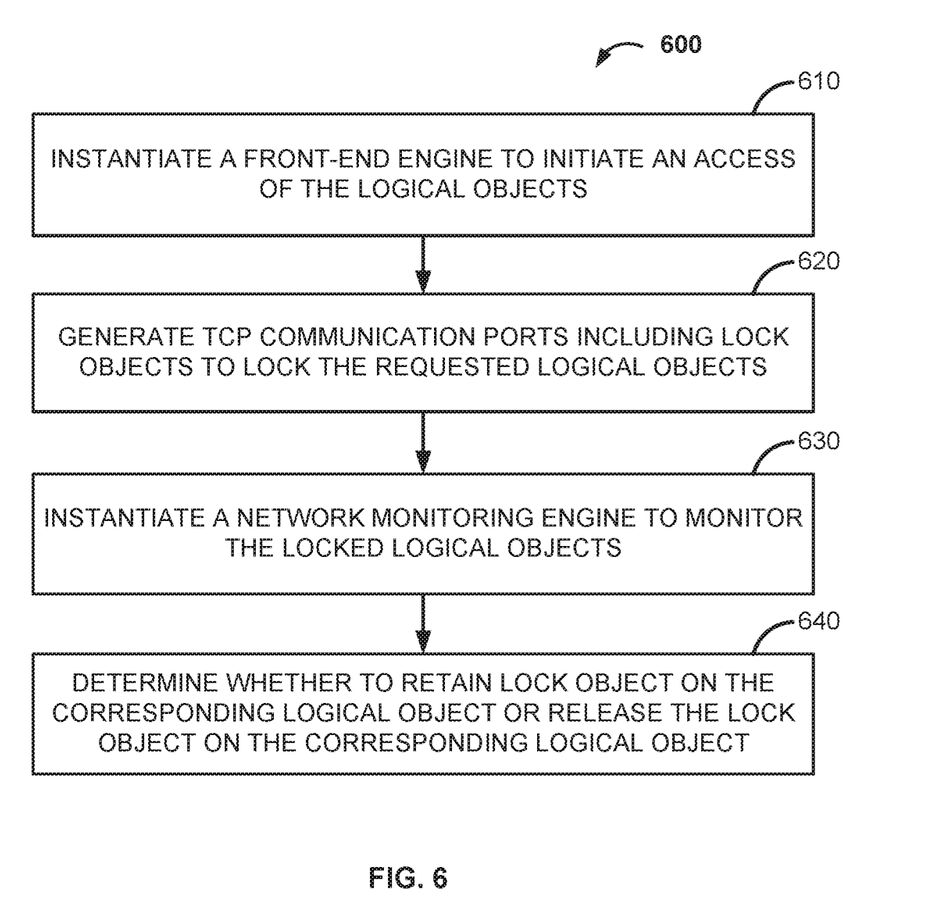
FIG. 6 is a flow diagram illustrating a process to manage access to a logical object, according to an embodiment.

FIG. 6 is a flow diagram illustrating process 600 to manage access to a logical object, according to an embodiment. As shown, FIG. 6 includes a sequence of steps executed to manage access to a logical object. In an embodiment, managing access to the logical object may include determining whether to retain lock (e.g., via a corresponding lock object) or release the lock on the logical objects in a software defined network. In an embodiment, upon receiving multiple requests from users, a front-end engine is instantiated to initiate an access of the logical objects, at 610 (e.g., as explained previous with reference to front-end engine). In response to the initiation, a back-end engine generates TCP communication ports including lock objects to lock the requested logical objects, at 620 (e.g., as explained previous with reference to back-end engine). In response to receiving information on the TCP communication ports, a network monitoring engine to monitor the logical objects is instantiated, at 630 (e.g., as explained previous with reference to network monitoring engine). In response to the monitoring, the network monitoring engine determines whether to retain the corresponding lock objects on the locked logical objects or to release the corresponding lock objects on the locked logical objects, at 640 (e.g., as explained previous with reference to the network monitoring engine). The operational efficacies of the front-end engine, the back-end engine, the network monitoring engine, etc., in process 600 are as described previously with reference to the respective components.

In an embodiment, customized data structures and associated logical operations on logical objects are thus isolated to the application where they are defined and cannot be accessed by external applications or integrated into a broader enterprise solution. At least some of the technologies described herein address these problems by managing access to logical objects and by processing service requests targeting operations associated with the logical objects. In an embodiment, the above described mechanism for managing access to the logical objects by the network monitoring engine may provide an improved efficiency and utility of resources in cloud computing environments. Real-time monitoring of the user activities and synchronization of information related to the logical objects between the devices and components in the software defined network may provide efficient management of access to the logical objects. The above described mechanism may be implemented on existing or legacy systems through minimal implementation and integration tweaks in the framework. In an embodiment, the cooperative working between the components in the SDN provides seamless integration of systems and dynamically allocate computing resources by adapting to load attributes in real-time by capturing user behavior in cloud computing system. The SDN may dynamically compute resources based on the user behavior and analytics of the network traffic. Such computations and analytics may provide reduced load on the data center controllers by effectively allocating memory (e.g., TCAM memory) for OF devices at data centers. The TCAM memory may refer to main memory of OF device, such as a OF enabled network switch or router.

Some embodiments may include the above-described methods being written as one or more software components. These components, and the associated functionality, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
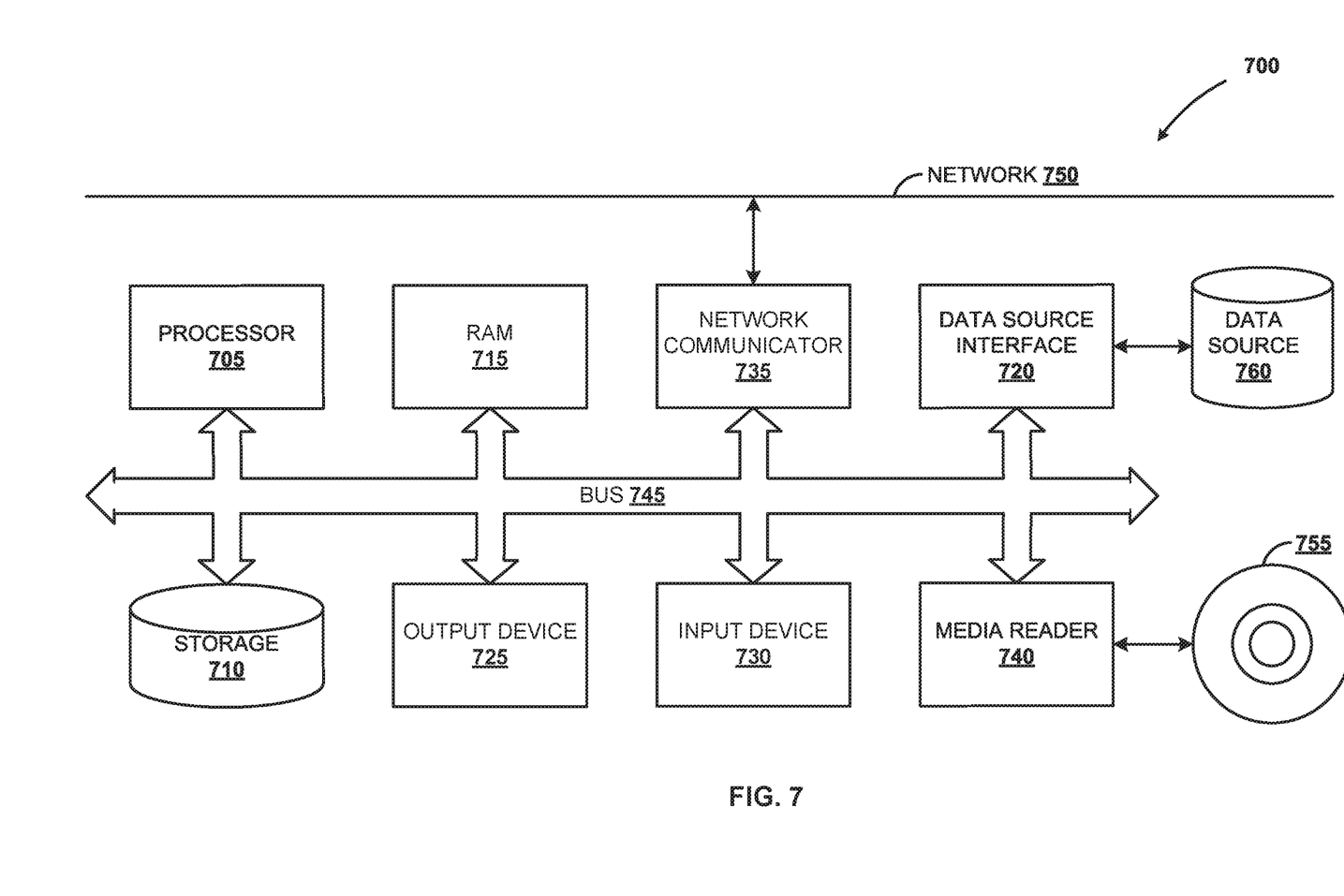
FIG. 7 is a block diagram of a computer system, according to an embodiment.

FIG. 7 is a block diagram of an exemplary computer system 700, according to an embodiment. Computer system 700 includes processor 705 that executes software instructions or code stored on computer readable storage medium 755 to perform the above-illustrated methods. Processor 705 can include a plurality of cores. Computer system 700 includes media reader 740 to read the instructions from computer readable storage medium 755 and store the instructions in storage 710 or in random access memory (RAM) 715. Storage 710 provides a large space for keeping static data where at least some instructions could be stored for later execution. According to some embodiments, such as some in-memory computing system embodiments, RAM 715 can have sufficient storage capacity to store much of the data required for processing in RAM 715 instead of in storage 710. In some embodiments, the data required for processing may be stored in RAM 715. The stored instructions may be further compiled to generate other representations of the instructions and dynamically stored in RAM 715. Processor 705 reads instructions from RAM 715 and performs actions as instructed. According to one embodiment, computer system 700 further includes output device 725 (e.g., a display) to provide at least some of the results of the execution as output including, but not limited to, visual information to users and input device 730 to provide a user or another device with means for entering data and/or otherwise interact with computer system 700. These output devices 725 and input devices 730 could be joined by one or more additional peripherals to further expand the capabilities of computer system 700. Network communicator 735 may be provided to connect computer system 700 to network 750 and in turn to other devices connected to network 750 including other clients, servers, data stores, and interfaces, for instance. The modules of computer system 700 are interconnected via bus 745. Computer system 700 includes a data source interface 720 to access data source 760. Data source 760 can be accessed via one or more abstraction layers implemented in hardware or software. For example, data source 760 may be accessed by network 750. In some embodiments data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details. Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system, comprising:
    a memory storing computer instructions; and
    a processor communicatively coupled with the memory to execute the instructions to perform operations comprising:
        upon receiving a request to access a logical object, instantiate a front-end engine to initiate access to the logical object;
        in response to the initiation of access, generate, by a back-end engine, a transmission control protocol (TCP) communication port including a corresponding lock object to lock the logical object;
        instantiate a network monitoring engine to monitor the locked logical object by:
            determining a count of data packets corresponding to each of one or more flow entries and the TCP communication port; and
            communicating the determined count of data packets to the back-end engine; and
        determine, by the network monitoring engine, and based on the count of data packets corresponding to each of one or more flow entries and the TCP communication port, whether to:
            retain the lock object on the logical object; or
            release the lock object from the logical object.

2. The computer system of claim 1, wherein in response to the back-end engine generating the TCP communication port, the front-end engine encapsulates access to the logical objects via the lock object.

3. The computer system of claim 1, wherein the determination to retain the lock object or release the lock object is based on monitoring information of the TCP communication port.

4. The computer system of claim 1, wherein monitoring the logical object comprises:
    monitor one or more user sessions based on a corresponding user identity; and
    monitor user traffic including one or more data packets corresponding to the logical object for one or more predefined time threshold values.

5. The computer system of claim 1, wherein instantiating the front-end engine to access the logical object comprises:
    processing the request at the front-end engine; and
    communicating with the back-end engine to determine an availability of the TCP communication port and the lock object for locking the access to the logical object.

6. The computer system of claim 1, further comprising:
    a front-end query classifier to monitor the request; and
    a back-end query classifier to classify the request including one or more queries based on a transmission control port addresses associated with the one or more queries.

7. A non-transitory computer readable storage medium tangibly storing instructions, which when executed by a computer, cause the computer to execute operations comprising:
    upon receiving a request to access a logical object, instantiate a front-end engine to initiate access to the logical object;
    in response to the initiation of access, generating, by a back-end engine, a transmission control protocol (TCP) communication port including a corresponding lock object to lock the logical object;
    instantiating a network monitoring engine to monitor the locked logical object by:
        determining a count of data packets corresponding to each of one or more flow entries and the TCP communication port; and
        communicating the determined count of data packets to the back-end engine; and
    determining, by the network monitoring engine and based on the count of data packets corresponding to each of one or more flow entries and the TCP communication port, whether:
        to retain the lock object on the logical object; or
        to release the lock object from the logical object.

8. The non-transitory computer readable storage medium of claim 7, wherein in response to the back-end engine generating a TCP communication port, the front-end engine encapsulates the access to the logical object via the lock object.

9. The non-transitory computer readable storage medium of claim 7, wherein the determination to retain the lock object or release the lock object is based on monitoring information of the TCP communication port.

10. The non-transitory computer readable storage medium of claim 7, wherein monitoring the logical object comprises:
    monitoring one or more user sessions based on a corresponding user identity; and
    monitoring user traffic including one or more data packets corresponding to the logical object for one or more predefined time threshold values.

11. The non-transitory computer readable storage medium of claim 7, the instructions, which when executed by the computer, further cause the computer to execute operations comprising:
processing the request at the front-end engine; and
communicating with the back-end engine to determine an availability of the TCP communication port and the lock object.

12. The non-transitory computer readable storage medium of claim 7, the instructions, which when executed by the computer, further cause the computer to execute operations comprising:
monitoring the request by a front-end query classifier; and
classifying the request by a back-end query classifier based on a transmission control port addresses associated with the one or more queries.

13. A computer-implemented method, comprising:
upon receiving a request to access a logical object, initiating access to the logical object;
in response to the initiation of access, generating a transmission control protocol (TCP) communication port including a corresponding lock object to lock the logical object;
monitoring the locked one or more logical objects by determining a count of data packets corresponding to each of one or more flow entries and the TCP communication port; and
based on the count of data packets corresponding to each of one or more flow entries and the TCP communication port, determining whether:
to retain the lock object on the locked logical object; or
to release the lock object from the locked logical object.

14. The computer implemented method of claim 13, further comprising: encapsulating the access to the logical object via the corresponding lock object.

15. The computer implemented method of claim 13, wherein the determination to retain the lock object or release the lock object is based on monitoring information of the TCP communication port.

16. The computer implemented method of claim 13, wherein monitoring the locked logical object comprises:
monitoring one or more user sessions based on a corresponding user identity; and
monitoring user traffic including one or more data packets corresponding to the ogical object for one or more predefined time threshold values.

17. The computer implemented method of claim 13, further comprising:
processing the request at a front-end engine; and
communicating with a back-end engine to determine an availability of the TCP communication port and the corresponding lock object.

* * * * *